US012762087B2

(12) United States Patent
Pishehvar et al.

(10) Patent No.: US 12,762,087 B2
(45) Date of Patent: Oct. 13, 2026

(54) RESPONSE GENERATION USING MULTIMODAL RETRIEVAL AUGMENTED GENERATION

(71) Applicant: Cisco Technology, Inc., San Jose, CA (US)

(72) Inventors: Ramin Pishehvar, La Crescenta, CA (US); Mahesh Viswanathan, White Plains, NY (US); Ali Payani, Cupertino, CA (US); Nima Nafisi, Herrliberg (CH)

(73) Assignee: Cisco Technology, Inc., San Jose, CA (US)

( * ) Notice: Subject to any disclaimer, the term of this patent is extended or adjusted under 35 U.S.C. 154(b) by 40 days.

(21) Appl. No.: 19/037,676

(22) Filed: Jan. 27, 2025

(65) Prior Publication Data

US 2026/0220085 A1 Jul. 30, 2026

(51) Int. Cl.
*G06F 16/00* (2019.01)
*G06F 16/11* (2019.01)
*G06F 16/3329* (2025.01)

(52) U.S. Cl.
CPC ...... *G06F 16/116* (2019.01); *G06F 16/33295* (2025.01)

(58) Field of Classification Search
CPC ......................... G06F 16/116; G06F 16/33295
USPC .......................................................... 707/756
See application file for complete search history.

(56) References Cited

U.S. PATENT DOCUMENTS

| | | | | |
|---|---|---|---|---|
| 11,907,674 | B1 | 2/2024 | Akerlund et al. | |
| 11,947,923 | B1 | 4/2024 | Jain et al. | |
| 2025/0182510 | A1* | 6/2025 | Malik | G06V 10/7715 |
| 2025/0232134 | A1* | 7/2025 | Shekhar | G06F 40/295 |
| 2025/0278417 | A1* | 9/2025 | Mui | G06F 40/30 |

FOREIGN PATENT DOCUMENTS

| | | | |
|---|---|---|---|
| CN | 116204706 | A | 6/2023 |
| CN | 117688220 | A | 3/2024 |
| CN | 118626662 | A | 9/2024 |

OTHER PUBLICATIONS

Github: "Clip-retrieval", Retrieved from https://github.com/rom1504/clip-retrieval on Dec. 16, 2024, pp. 1-11.

Koh J.Y., et al., "Grounding Language Models to Images for Multimodal Inputs and Outputs", arXiv:2301.13823v4 [cs.CL], Jun. 13, 2023, pp. 1-18.

(Continued)

*Primary Examiner* — Monica M Pyo
(74) *Attorney, Agent, or Firm* — Merchant & Gould P.C.; Kenneth J. Heywood

(57) ABSTRACT

In one implementation, a device receives an input query from a requester. The device uses a multimodal large language model to generate an output based on the input query. The device identifies one or more files by performing a search of an information retrieval index based on the input query. The device provides, to the requester, a response to the input query that is based on the output of the multimodal large language model and on the one or more files.

20 Claims, 8 Drawing Sheets

(56) References Cited

OTHER PUBLICATIONS

Langchain: "Multi-Vector Retriever for RAG on Tables, Text, and Images", Oct. 20, 2023, Retrieved from https://blog.langchain.dev/semi-structured-multi-modal-rag/ accessed on Dec. 16, 2024, pp. 1-6.
Llamaindex: "Evaluating Multi-Modal Retrieval-Augmented Generation", Nov. 16, 2023, Retrieved from https://www.llamaindex.ai/blog/evaluating-multi-modal-retrieval-augmented-generation-db3ca824d428, Accessed on Dec. 16, 2024, pp. 1-8.
Siegler R., "Guide to Multimodal RAG for Images and Text", KX Systems, Medium, Feb. 12, 2024, Retrieved from https://medium.com/kx-systems/guide-to-multimodal-rag-for-images-and-text-10dab36e3117 on Dec. 16, 2024, pp. 1-26.
Surla A., et al., "An Easy Introduction to Multimodal Retrieval-Augmented Generation", NVIDIA Technical Blog, Mar. 20, 2024, Retrieved from https://developer.nvidia.com/blog/an-easy-introduction-to-multimodal-retrieval-augmented-generation/ on Dec. 16, 2024, pp. 1-17.
Zhao R., et al., "Retrieving Multimodal Information for Augmented Generation: A Survey", EMNLP 2023, Oct. 8, 2023, 21 Pages.

* cited by examiner

RESPONSE GENERATION USING MULTIMODAL RETRIEVAL AUGMENTED GENERATION

TECHNICAL FIELD

The present disclosure relates generally to artificial intelligence (AI) and, more particularly, to response generation using multimodal retrieval augmented generation (RAG).

BACKGROUND

Retrieval Augmented Generation (RAG) is a technique used to avoid hallucinations and enhance the output of Large Language Model (LLMs). Such enhancements are obtained by dynamically adding contextual information to the prompt of the user. This is usually done by retrieving contextual information from a vector database, which was previously populated with the relevant information.

However, current multimodal RAG often relies on non-text to text conversion whereby non-textual modalities (e.g., audio, images, etc.) are first flattened to text and then RAG-processed. The LLM responses are also in text and generated without knowledge of the non-text inputs used. However, this matching process is inadequate and loses contextual bearings. Indeed, text-only responses are limited and may not satisfy the queries of the users.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device receives an input query from a requester. The device uses a multimodal large language model to generate an output based on the input query. The device identifies one or more files by performing a search of an information retrieval index based on the input query. The device provides, to the requester, a response to the input query that is based on the output of the multimodal large language model and on the one or more files.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
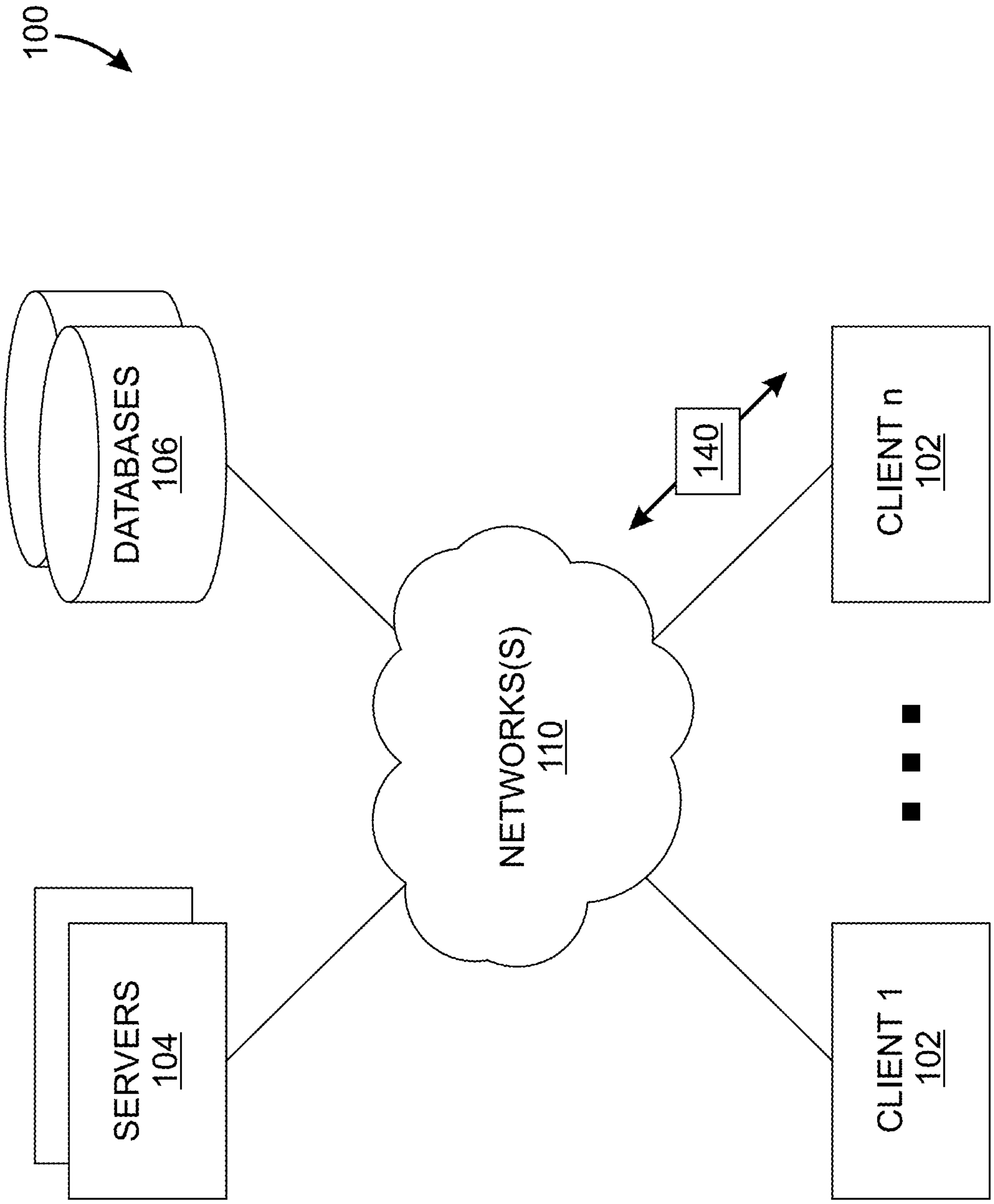
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device (s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
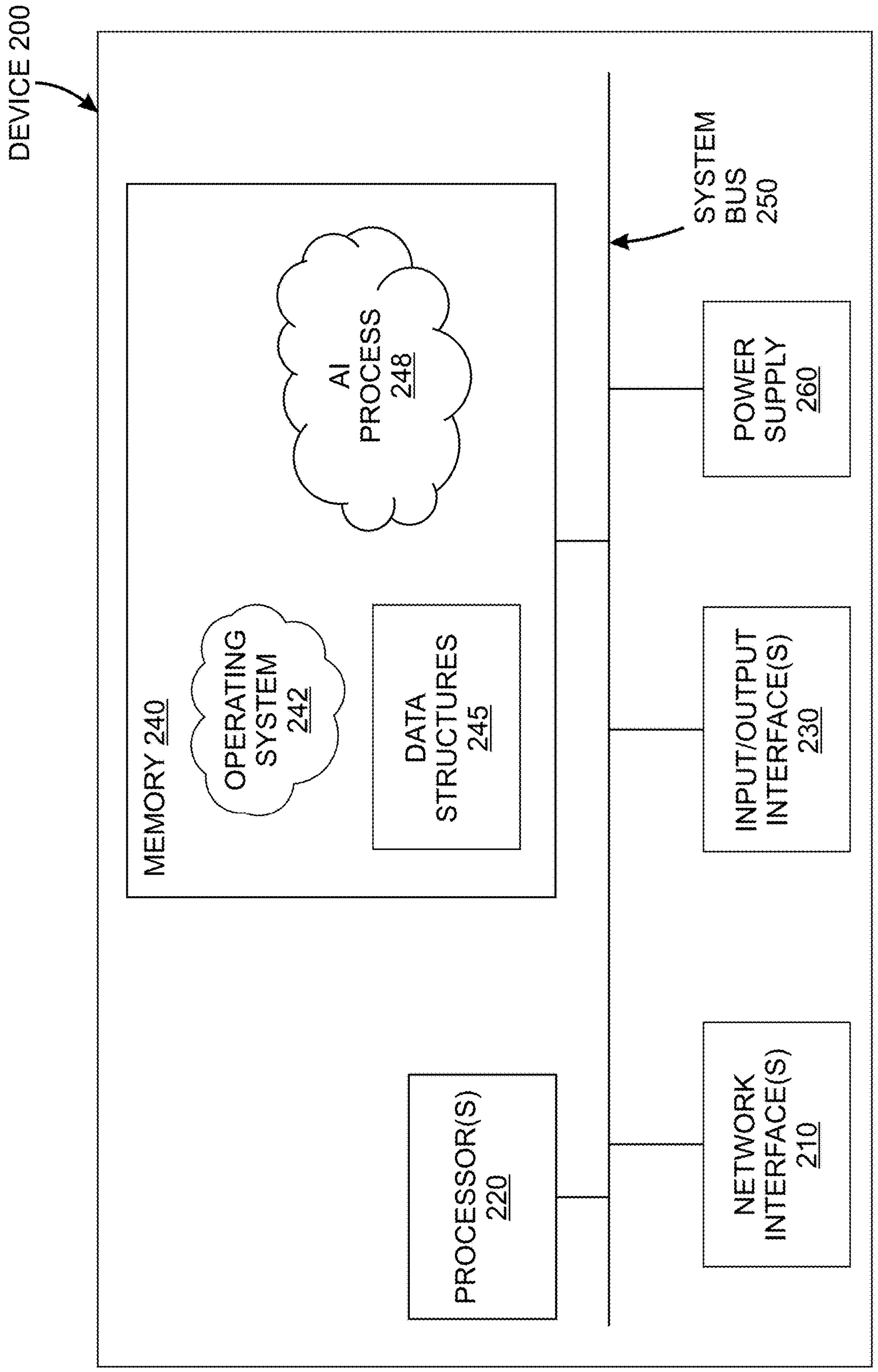
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an AI process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, AI process 248 may include computer executable instructions that, when executed by processor 220, cause device 200 to perform the techniques described herein. To do so, in some implementations, AI process 248 may utilize AI/machine learning. In general, AI/machine learning is concerned with the design and the development of techniques that take as input empirical data (such as network statistics and performance indicators) and recognize complex patterns in these data. One very common pattern among these techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, AI process 248 may employ and/or be utilized to handle prompts to and/or access of one or more supervised, unsupervised, or semi-supervised AI/machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example AI/machine learning techniques that the AI process 248 can employ and/or be utilized in concert with may include, but are not limited to, nearest neighbor (NN)

techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time-series), random forest classification, or the like.

In further implementations, AI process 248 may also include, or otherwise use or be employed to operate with, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of machine unlearning, AI process 248 may be a component of, use, and/or be utilized in the management of prompts/access to a generative model to perform layer attribution, perform layer sensitivity assessment, remove capabilities from a previously trained model, retain model performance, etc. based on a conversational input from a user (e.g., voice, text, etc.). Example generative approaches can include, but are not limited to, generative adversarial networks (GANs), large language models (LLMs) and other foundation models, diffusion models, transformer models, and the like.

Figure 3:
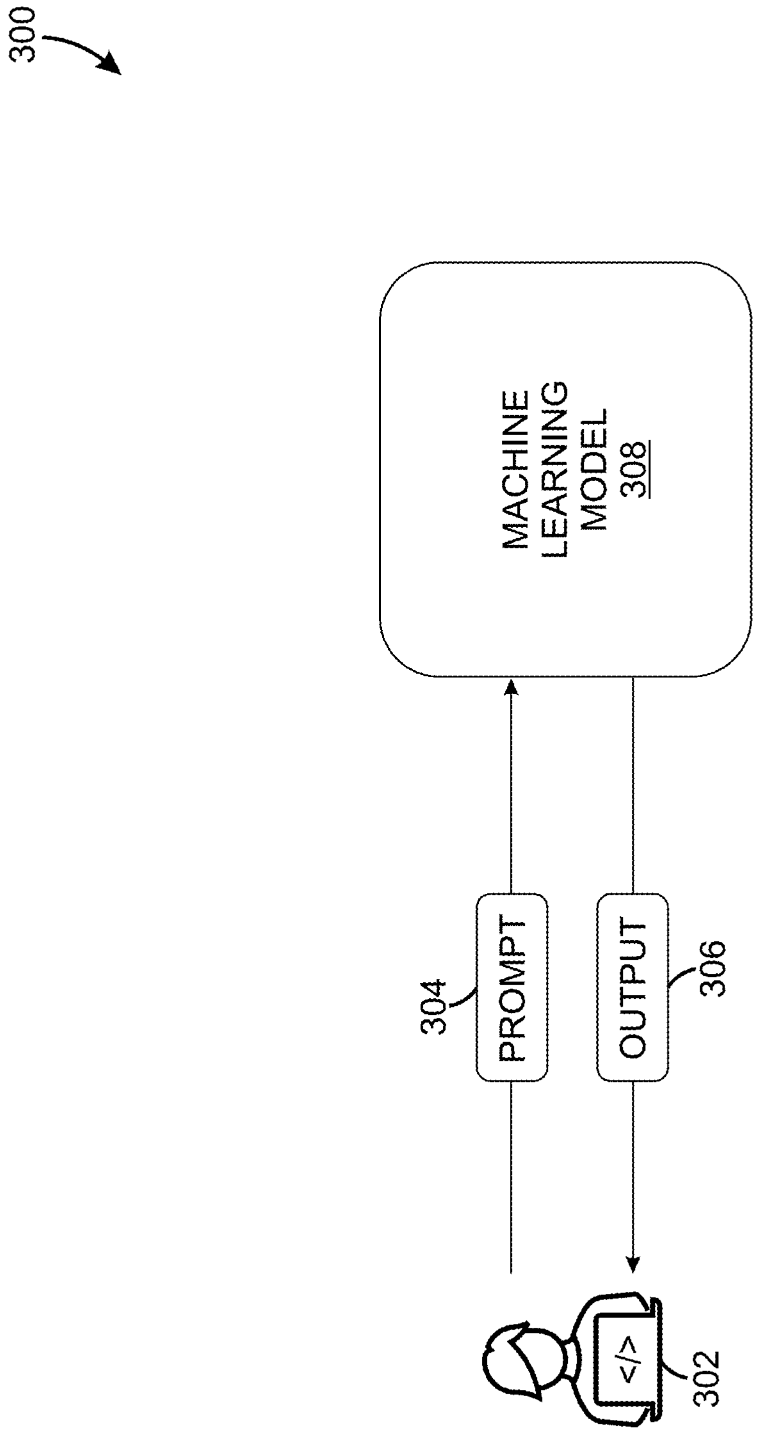
FIG. 3 illustrates an example of a user interfacing with a language model.

FIG. 3 illustrates an example 300 for interfacing with a language model, in various implementations. In example 300, a user 302 may send a prompt 304 (e.g., a query, a query augmented with additional data, documents, and/or images, etc.) to a generative model 308. The generative model 308 may be configured to process a prompt 304 to generate an output 306 to satisfy the prompt 304.

The generative model 308 may be a model configured to apply its trained algorithms to generate a response (e.g., output 306) based on the prompt 304 provided. For instance, in some cases, generative model 308 may take the form of a large language model (LLM) or other foundation model, diffusion-based model, combinations thereof, or the like.

The output 306 may be the result produced by the generative model 308 (e.g., by the application of the generative model 308 to the prompt 304). This output can vary depending on the model's configuration and the task at hand. For example, the output 306 may include one or more of a generated and/or synthesized image, a text response, a classification and/or prediction, etc.

As noted above, AI agents are also capable of interacting with generative models, such as generative model 308, which may be integrated directly into the agent or accessed via an API. Indeed, the recent breakthroughs in large language models (LLMs), such as GPT-4, as well as other generative models, represent new opportunities across a wide spectrum of industries. More specifically, the ability of these models to follow instructions now allow for interactions with tools (also called plugins) that are able to perform tasks such as searching the web, executing code, etc. In addition, agents can be written to perform complex tasks by chaining multiple calls to one or more LLMs. For example, a first step can consist in formulating a plan in natural language, and subsequent steps in executing on this plan by writing code to call application programming interfaces (APIs) or libraries.

Figure 4:
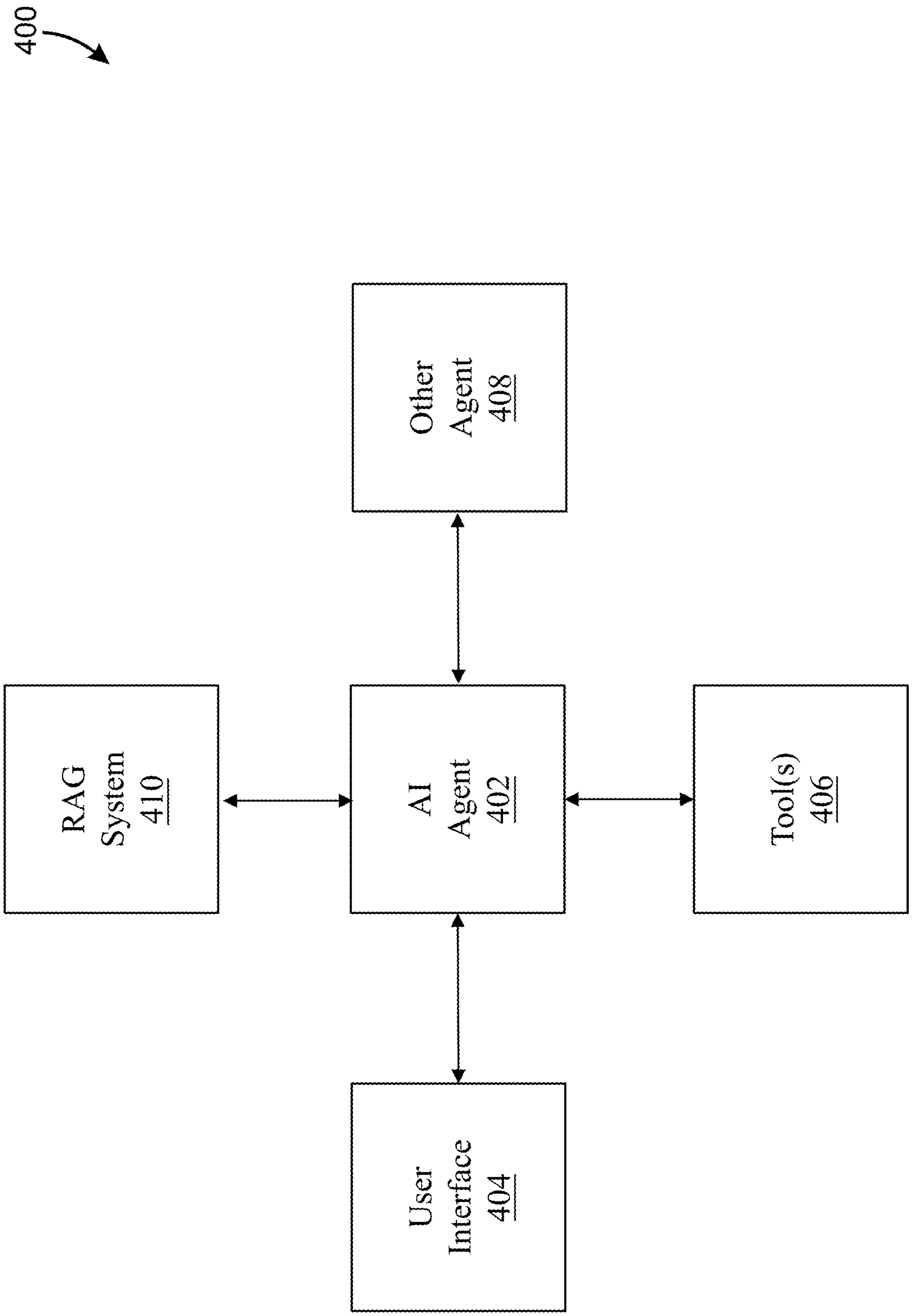
FIG. 4 illustrates an example architecture for an artificial intelligence (AI) agent.

FIG. 4 illustrates an example architecture 400 for an artificial intelligence (AI) agent, according to various implementations. At the core of architecture 400 is AI agent 402, which may be implemented through execution of AI process 248.

As shown, AI agent 402 may interact with a user via a user interface 404. For instance, a user may issue a prompt to AI agent 402 that seeks an answer to a question, performance of a certain task, or the like. In turn, AI agent 402 may use its associated model to formulate a response.

Also as shown, AI agent 402 may interact with tools 406. In general, tools 406 may take the form of interfaces that allow AI agent 402 to interact with any number of systems, in its efforts to produce a response for its input request. For instance, tools 406 may allow AI agent 402 to perform searches (e.g., web searches, searches within a given application or database, etc.), send control commands, or perform other actions, as needed.

In various implementations, AI agent 402 may also be part of an agentic system whereby multiple AI agents interact with one another to formulate a response to an input request. Indeed, the tools, models, etc. available to any given agent may differ across the agentic system. Consequently, different agents may have different capabilities and specialties. Thus, in some implementations, AI agent 402 may also interact with other agent 408, to aid in formulating a final response to its input request. Typically, other agent 408 is executed by a different device than that of the device execution AI agent 402, meaning that AI agent 402 and other agent 408 may communicate via a computer network. In other implementations, though, both agents may be executed by the same device, in further implementations.

For instance, assume that other agent 408 uses a model that has be specialized using knowledge about computer networks and interfaces with tools capable of interacting with a computer network (e.g., to retrieve information, make configuration changes, etc.). Now, assume that the user of user interface 404 issues a query to AI agent 402 asking why the performance of their videoconferencing application is poor. Further, assume that AI agent 402 uses a model that has been specialized on knowledge about the videoconferencing application and able to interact with that application via tools 406. If its initial assessment of the operation of the videoconferencing application is that everything appears to be performing well at the server level, AI agent 402 may then issue a request to other agent 408, to see whether the root cause of the poor performance is the computer network itself.

In some implementations, AI agent 402 may also interact with, or include, a retrieval augmented generation (RAG) system, such as RAG system 410. In general, RAG systems operate by enhancing a prompt for input to a generative model (e.g., an LLM) with additional context. Typically, underlying a RAG system is a dataset of documents or other information that is in a particular domain. For instance, consider the case of AI agent 402 generating a prompt that asks its LLM to make an assessment regarding a computer network. In the case of a general LLM, the LLM may not have specialized knowledge regarding the devices in the network (e.g., command line interface commands, information about the topology of the network, etc.). In such a case, RAG system 410 may modify the prompt, prior to input to the LLM, to provide this additional context, thereby improving the quality of the response and avoiding hallucinations. Typically, a RAG system stores this contextual information in a vector database for quick retrieval using semantic searching.

As noted above, RAG can help avoid hallucinations and enhance the output of LLMs or other generative AI models. Such enhancements are obtained by dynamically adding contextual information to the prompt for input to the model. This is usually done by retrieving contextual information from a vector database, which was previously fed with the relevant information.

However, current multimodal RAG often relies on non-text to text conversion whereby non-textual modalities (e.g., audio, images, etc.) are first flattened to text and then RAG-processed. The LLM responses are also in text and generated without knowledge of the non-text inputs used. However, this matching process is inadequate and loses contextual bearings. Indeed, text-only responses are limited and may not satisfy the queries of the users. In addition, users may want options for the output (e.g., both text responses and pointers to video, audio, speech, graphics, etc.). Users may also want the ability to get a pointer in the modality form of their liking irrespective of how the initial source of knowledge is stored. Those users may also want to have a way to retrieve the exact section where the source of information is, without spending time in reviewing a long source of info to pinpoint the required information.

Response Generation Using Multimodal RAG

The techniques introduced herein enhance the functions of RAG systems, particularly those that are multimodal (e.g., text+images, etc.), to support multimodal inputs and responses. Further aspects of the techniques herein introduce a question-answering (QA) mechanism for RAG that switches between using text transcription of multimodal content (e.g., using image-to-text conversion, etc.) and using a native, multimodal knowledge base for LLM response generation.

Illustratively, the techniques described herein may be performed by hardware, software, and/or firmware, such as in accordance with AI process 248, which may include computer executable instructions executed by the processor 220 (or independent processor of interfaces 210) to perform functions relating to the techniques described herein.

Specifically, according to various implementations, a device receives an input query from a requester. The device uses a multimodal large language model to generate an output based on the input query. The device identifies one or more files by performing a search of an information retrieval index based on the input query. The device provides, to the requester, a response to the input query that is based on the output of the multimodal large language model and on the one or more files.

Figure 5:
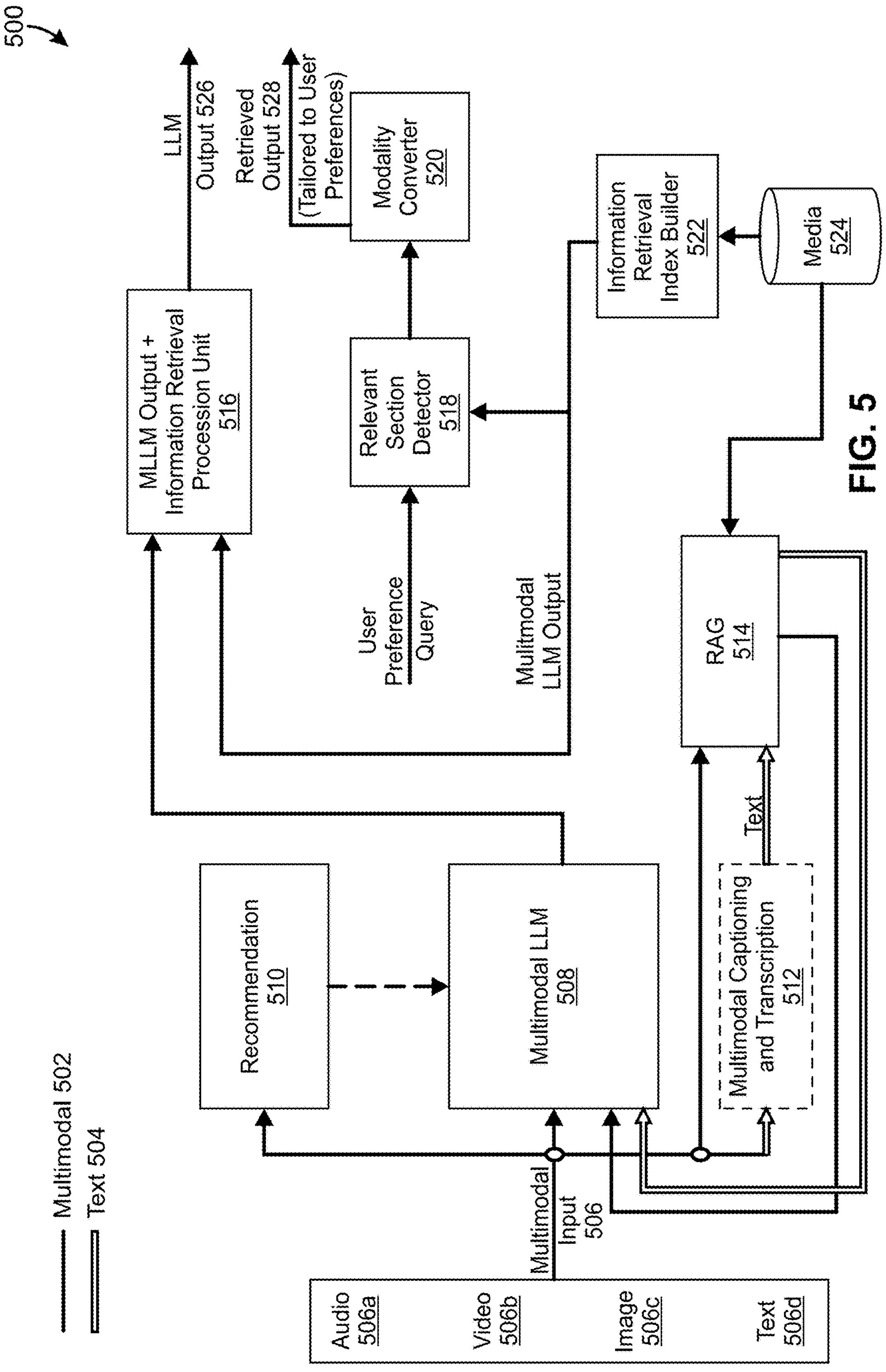
FIG. 5 illustrates an example architecture for performing multimodal retrieval with multimodal retrieval augmented generation (RAG)

Operationally, FIG. 5 illustrates an example architecture 500 for performing multimodal retrieval with multimodal retrieval augmented generation (RAG), according to various implementations. As shown, architecture 500 may perform any or all of the following:

- Process audio, video, image, and graphics files natively to extract multimodal descriptors.
- Flatten audio, video, image, and graphics files to extract text descriptors.
- Combine multimedia retrieval techniques on top of semantic embedding (RAG) to return textual responses embedded with references to audio or video files (and locations within the audio, video, image files) that best addresses the user prompt.
- This allows users to click into the actual multimedia content to review responses that augment the multi-modal LLM (MLLM) responses.
- To pinpoint the exact location/time where the relevant info exists, a detector (in the form of an agent or shared embeddings) can extract the relevant location in time/space within a longer document used as a source.
  - The relevant section detector can either use the prompt directly to pinpoint the location in the source to be presented and, optionally, process a specified preference/request from the user.
- The user may also be able to decide in which format/modality they want the source of the information to be presented, and an agent can take care of converting any given native modality of the source of the document to any request modality at the output.

More specifically, as shown, a requester such as a user operating a user interface, may specify an input query 506 that includes data in any number of different modalities. For instance, input query 506 may include any or all of the following: audio **506*a*, video 506*b*, an image 506*c*, and/or text 506*d***. In some instances, the input query may simply include one or more links to files in which this information is stored. In other instances, the input query may support inclusion of the file itself embedded into the query.

Processing by architecture 500 may leverage a multimodal RAG system 514 that is built on top of a multimodal knowledge base in which media 524 is stored or referenced. For instance, the multimodal knowledge base may take the form of videos, GitHub code, all-hands content, audio files, customer service documents, product manuals, recordings, training videos, how-to videos, podcasts, etc. In one implementation, media 524 may be stored within an intranet associated with a business or other entity.

According to various implementations, architecture 500 may include an information retrieval index builder 522 that is configured to construct an index of media 524 that is available to architecture 500. To do so, information retrieval index builder 522 may flatten videos using inline audio transcription where possible. In a further implementation, information retrieval index builder 522 may perform video indexing based on scene content for videos without embedded audio.

For each user prompt, architecture 500 may perform multimodal captioning and transcription 512, to extract text descriptors from textual RAG context and multimodal RAG embeddings. Thus, architecture 500 may include two processing paths: a multimodal path 502 that supports multimodal data and a text path 504 that supports text processing.

Given input query 506, architecture 500 may use this as input to multimodal LLM 508. In some implementations, multimodal RAG system 514 may also augment input query 506 based on media 524 and/or a recommendation 510. In turn, multimodal LLM 508 may generate an output (e.g., an intermediate response to input query 506). However, this output may not have any specific content from media 524.

Concurrent to multimodal LLM 508 generating an output, architecture 500 may use an LLM to summarize the input prompt of input query 506 and extract keywords from it, to generate semantic equivalents. Architecture 500 may then use this text to retrieve references from the index constructed by information retrieval index builder 522 (e.g., the index of media 524 stored in in the intranet of the organization).

Once architecture 500 has identified the one or more media files relevant to the input prompt, it may then proceed as follows, depending on the output of multimodal LLM 508. If the output is textual, then processing unit 516 of architecture 500 may insert references to the file(s) from the information retrieval subsystem into the output, to form a response to be returned to the user. In some cases, these references may even be to specific segments of the file(s).

However, if the output of multimodal LLM 508 is multimodal and/or non-textual, architecture 500 may insert the information retrieval results as an attachment to the specific local content. In such cases, architecture 500 may add links to the text part of the response.

In some implementations, the requester may also ask for sections in the media 524 (e.g., a portion of a longer audio, video, or image file) of specific interest, such as by specifying one or more preferences. In such a case, relevant section detector 518 may identify those relevant portions for inclusion in the final response.

According to various implementations, architecture 500 may also include a modality converter 520 that is operable to convert a particular file from the information retrieval portion of architecture 500 into a different modality. For instance, the user may request a transcription from the audio except (for hearing impaired people) or to change video to descriptive audio (for visually impaired individuals) and modality converter 520 may convert those matching file(s), accordingly.

Thus, the final response from architecture 500 may be based on two outputs: 1.) output 526 from multimodal LLM 508 (and potentially augmented by processing unit 516) and 2.) the retrieved output 528 from the information retrieval portion of architecture 500. Here, retrieved output 528 may take the form of one or more files, or links thereto. The end result is a response for the requester that better answers their query by leveraging their existing files on their network.

By way of example, architecture 500 may be capable of generating responses to text-only prompts such as:

"Show me how to troubleshoot product X and help me step by step through some of the complex intermediate steps preferably with audio or video cues."

"Generate music that has the same style as singer Y and find me the lyrics on the web."

"Find the time and date when <this> event happened and show me the actual camera feed where there is one."

In turn, architecture 500 may generate a corresponding response that may be text-only or multimodal with any number of modalities. For instance, in the case of the above prompt asking for a time and date, architecture 500 may respond with a time and date and the response string will be embedded with appropriate video links. If the video is indexed by event within it, then the response may also link to the corresponding segments within the video.

In addition, architecture 500 may also be capable of handling multimodal input queries such as the example queries below:

"Create a video that follows the style of the video in my prompt to troubleshoot product X and also include links to similar videos others have created."

"Based on the photo identities in the prompt, find if any of the persons in the photo spoke at the AI conference in San Francisco; and add links to video excerpts of their presentations. Only display those sections of the video where that presenter from the prompt is present. Also, convert the audio from the presentation to close captioning for hearing impaired persons."

"Based on the music sample in my prompt, generate music that follows the same style; and also share pointers to examples in other genres where similar music videos (or MP3s) can be found (heard). More specifically, extract those sections where percussion is present. Also, generate info on how many beats per second is the drummer generating (conversion of modalities)."

Further, architecture 500 may also be capable of generating multimodal responses to queries such as the following:

"Create a PowerPoint presentation on the Q4 financial report of the company, which includes financial charts, bullet points about the key summary points, and audio captioning for visually impaired users. Also, include links to the video where the CEO presents the outlook for 2025."

"Create a video tutorial on Python programming by using the style in the tutorial in the input prompt, add also text captioning for visually impaired people as well as an audio description of the video."

Figure 6:
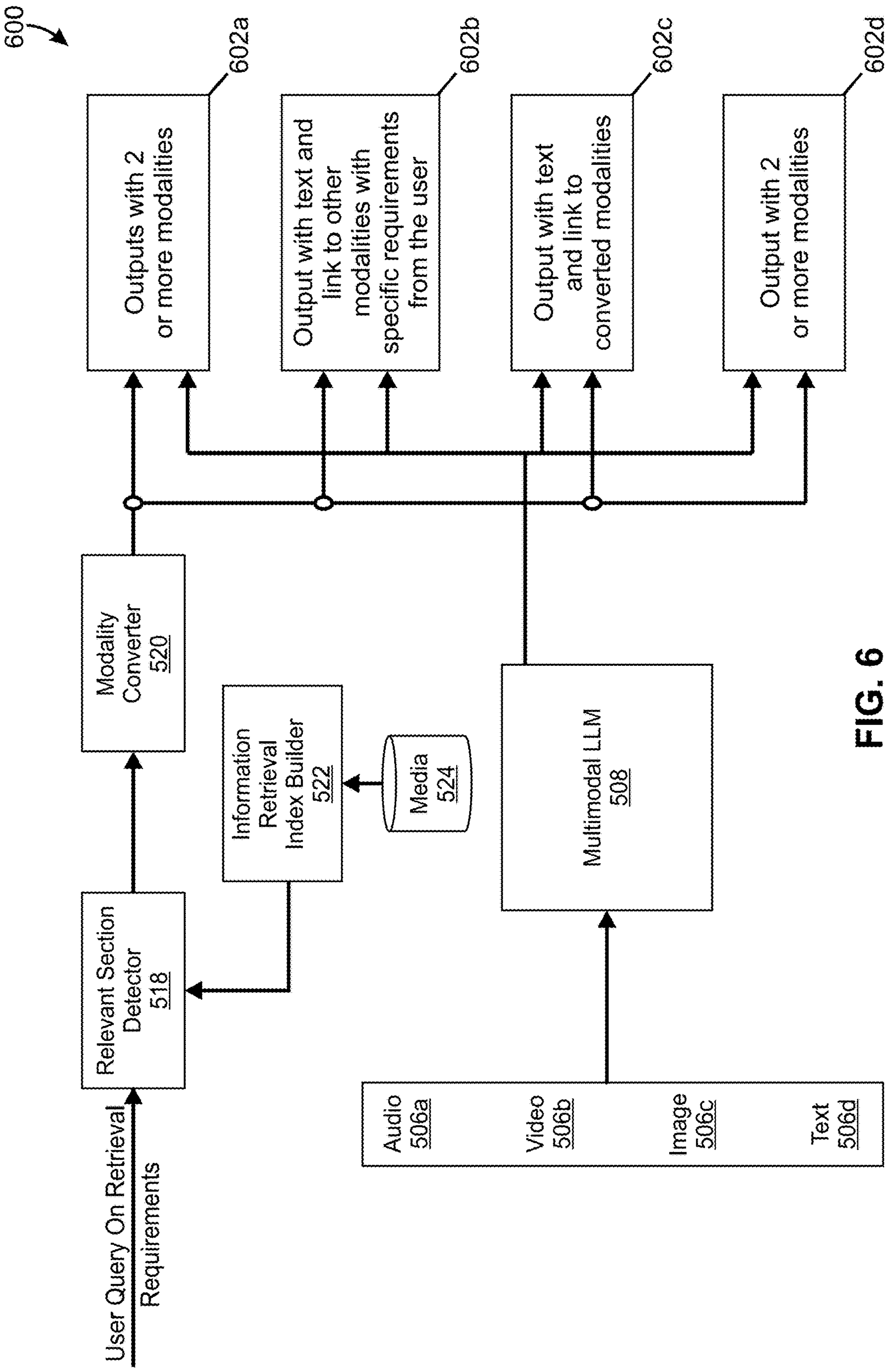
FIG. 6 illustrates an alternate example architecture that combines a multimodal information retrieval system with a multimodal RAG system.

FIG. 6 illustrates an example architecture 600 that combines a multimodal information retrieval system with a multimodal RAG system, according to various implementations. As noted above, the techniques herein leverage both the output of a multimodal LLM and of an information retrieval mechanism, to formulate a response to an input query. While these two data pipelines are interconnected in architecture 500, they may also be implemented as separate systems, as shown in architecture 600.

More specifically, example architecture 600 may include an information retrieval pipeline that includes relevant section detector 518, information retrieval index builder 522, and/or modality converter 520 that is operable to identify those file(s) (and portions thereof) that are relevant to the input query.

The information retrieval pipeline may, for instance, be implemented using one or more Contrastive Language-Image Pretraining (CLIP)-type models, where a contrastive loss function is used to learn association between multiple modalities. The system can be trained by learning appropriate encoders for each modality in a way to increase agreements between representation of each two pairing modalities for pairs of data, these pairs can be image+text, music+text (lyrics), video+music, video+text, or any other pair of different modalities.

For instance, over time, architecture 600 may output a first response **602*a* having two or more modalities (e.g., video and text), a second response 602*b* that includes text and a link to a file having a different modality based on the specific constraints of the user, a third response 602*c* with text and a linked file converted to a different modality, a fourth response 602*d*** with two or more modalities (e.g., images and text), etc.

The encoders in architecture 600 can be used after training to index catalogs of multimodal data for each modality and create cross-referencing. In the generator, a set of conditional generators can be imagined where the condition is not from a single modality but from the encoded representation of cross-referenced multimodal data. The generator can be a text generator, or image and video or even music generator.

Each generator should be trained/finetuned to learn to incorporate the shared embedding vectors. Typically, this may require the use of a custom generator. For instance, in the case of text generation, architecture 600 may not use a commercial generator (e.g., ChatGPT), but rather finetune an open-source model to learn to incorporate the shared representation. Another potential alternative is to somehow translate the multimedia content to some standard format, i.e., text or image.

In one implementation, architecture 600 may also use some form of simple prompt intelligence to decide, based on the initial query, what form of modality are more appropriate to be used in each request. In a further implementation, architecture 600 may limit the generation to text and only consider ways to transcribe each information into text to make the generation more flexible.

Figure 7:
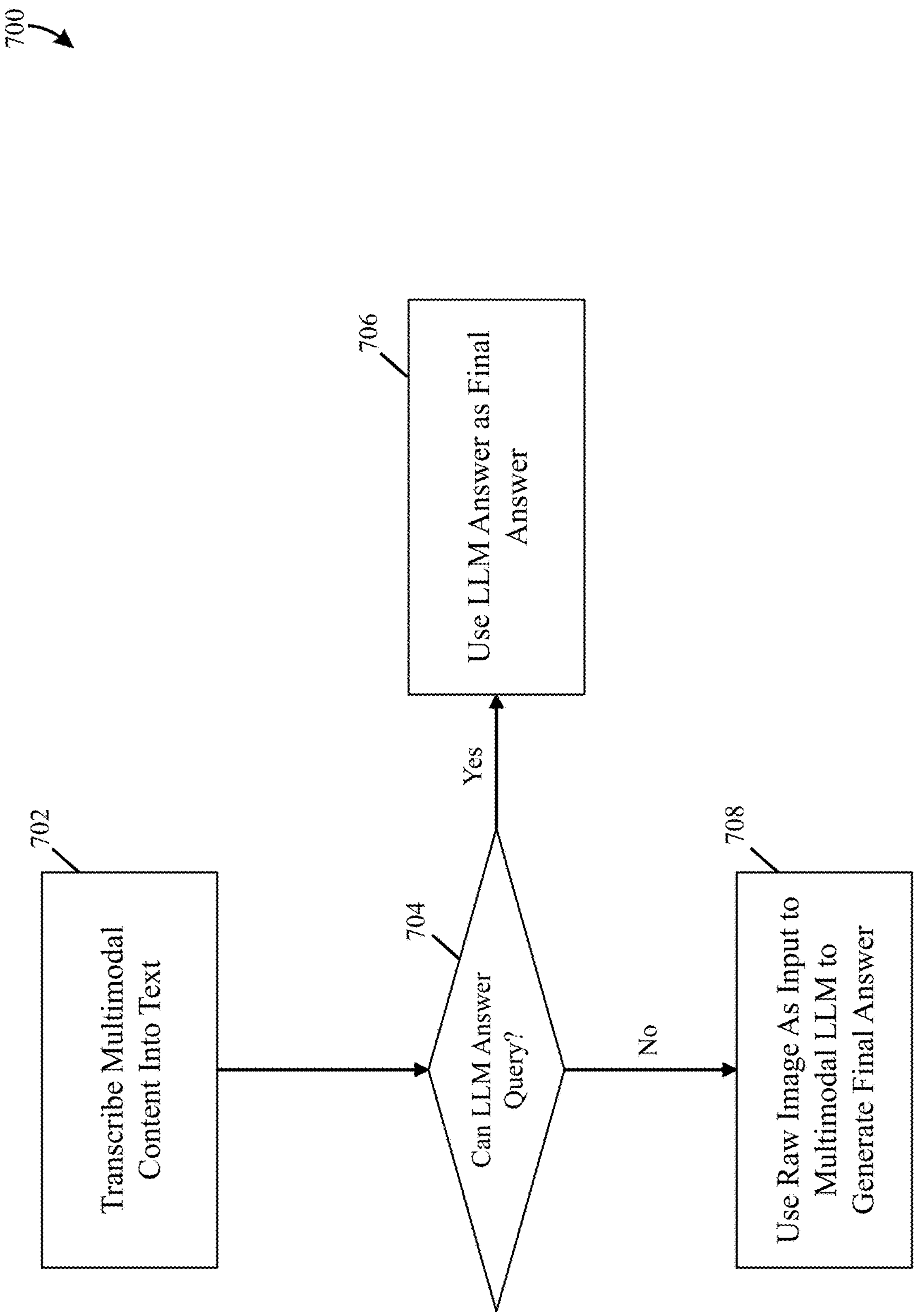
FIG. 7 illustrates an example flow diagram showing the selective switching between using text transcription and a native knowledge base for response generation.

FIG. 7 illustrates an example flow diagram 700 showing the selective switching between using text transcription and a native knowledge base for response generation, according to various implementations. As would be appreciated, a RAG system can use various approaches to support multi-modal inputs. In some cases, the RAG system may use an LLM to transcribe graphs and/or other multimodal content into text, then using the converted text to search a text-only knowledge base, to answer questions. Alternatively, the RAG system may use graphics directly as input to a multi-modal LLM for question-answering (QA). One way to do so would be to find the top k-number of multimodal documents using similarity indices of shared embeddings. Another way would be to use the entire multimodal knowledge as context to the LLM. Both of these approaches, though, have tradeoffs.

The techniques herein provide for optimized performance in multimodal question-answering (QA) in a context-aware, multimodal retrieval augmented generation (RAG) system, such as the system introduced above, by switching between text transcription of multimodal content and using a native multimodal knowledge base for LLM response generation. Here, the optimality in performance is defined as an increase in the accuracy of the response, as well as a decrease in latency of the generate response. Further aspects of the techniques herein can also integrate a hallucination detection/mitigation step.

More specifically, the techniques herein introduce multi-modal routing mechanism that combines both potential approaches, as shown in flow diagram 700. At step 702, the system may use the former approach by first transcribing the multimodal data into text. Then, at step 704, the system may ask its LLM whether the model can answer the question based on its textual knowledge and given the transcribed text. At step 706, if the answer from the LLM is "yes," then then system uses the response from the LLM as the final answer to the question.

However, if the answer at step 704 is "no," then the system may decide to use the raw data (e.g., an image, a video clip, etc.) as input to the multimodal LLM of the system (i.e., the raw data without transcription), at step 708. The raw image graphics can be a single, multimodal document or it can be a knowledge base consisting of raw image graphics that are retrieved through a shared embedding retriever. Then, the final answer to the QA is the response of the multimodal LLM.

As would be appreciated, the above routing optimizes the framework in terms of latency/cost, since it can be expected, in most cases, that the processing will not need to go to multimodal input processing and perform only text-based analysis, in most cases. Of course, if cost/latency is not an issue, the system could also run both the transcribed data and the raw data at all times. In turn, it could then compare the two responses, such as by using an LLM-as-a-judge to detect hallucination in the response, in one implementation. In such cases, differing responses may indicate a hallucination. Such an LLM-as-a-judge may take the form of an LLM that establishes whether the two answers to a given question are the same. If the judge then detects a hallucination the system may use the data from steps 702-708 (e.g., the transcribed text, the raw image/video/audio/other data, and the two responses from the model) to ask the model to reconcile the discrepancy and produce a factual answer.

Figure 8:
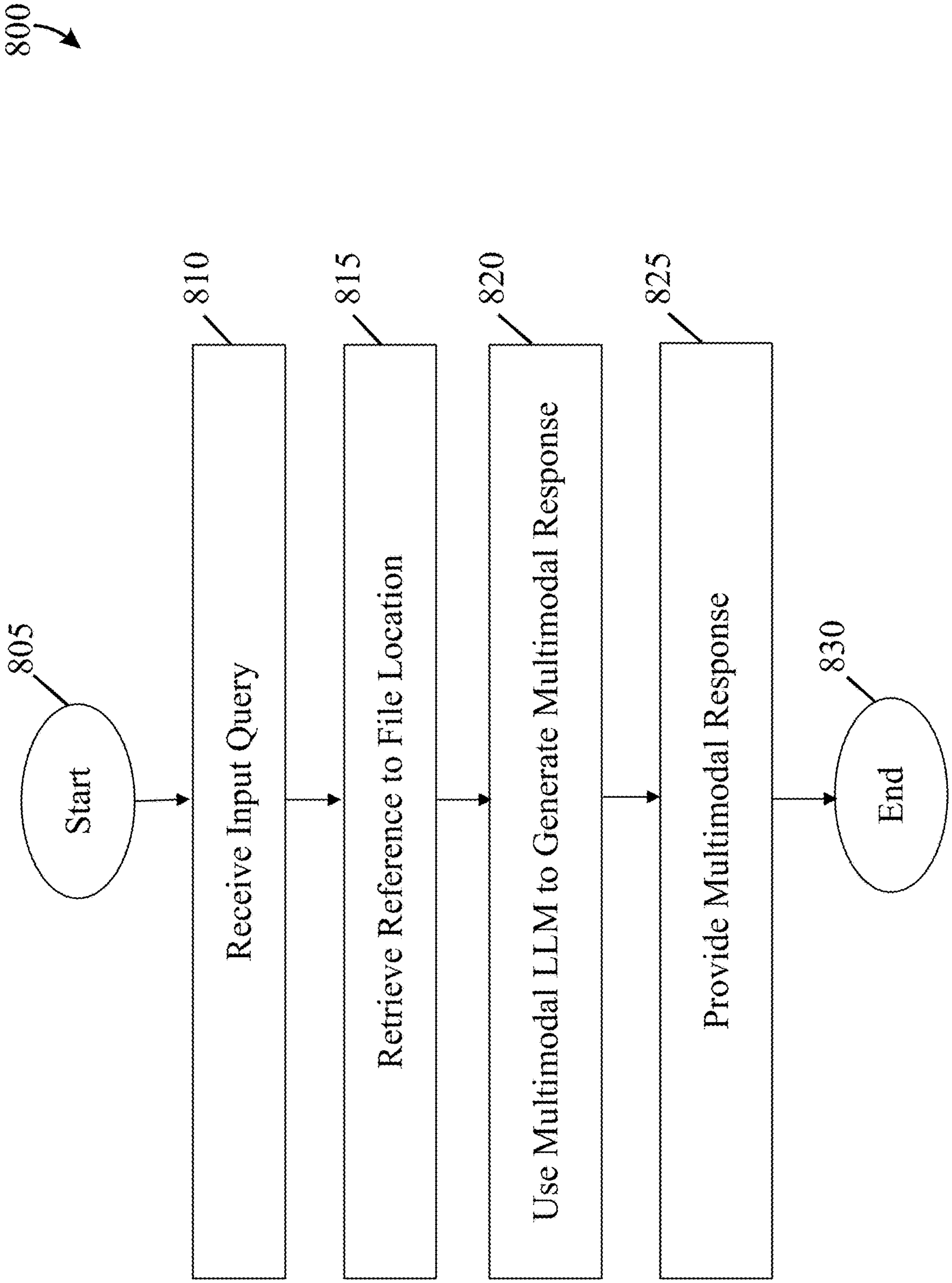
FIG. 8 illustrates an example of a simplified procedure for response generation using multimodal RAG, in accordance with one or more implementations described herein.

FIG. 8 illustrates an example of a simplified procedure for response generation using multimodal RAG, in accordance with one or more implementations described herein. For example, a non-generic, specifically configured device (e.g., device 200), may perform procedure 800 (e.g., a method) by executing stored instructions (e.g., AI process 248). The procedure 800 may start at step 805, and continues to step 810, where, as described in greater detail above, the device (e.g., a controller, server, etc.) may receive an input query from a requester. In some cases, the input query includes two or more of: text, an image, audio, or video. In one implementation, the requester comprises a user interface.

At step 815, as detailed above, the device may use a multimodal large language model to generate an output based on the input query. In various implementations, the device may also use the multimodal large language model to convert at least a portion of the input query into transcribed text and determine whether a large language model is able to answer the input query using the transcribed text. In some instances, the device uses the multimodal large language model to generate the output based on the input query, when the large language model indicates that it cannot answer the input query based on the transcribed text. In one implementation, the device may compare an output of the large language model generated using the transcribed text with the output of the multimodal large language model generated based on the input query, to determine which to include in the response.

At step 820, the device may identify one or more files by performing a search of an information retrieval index based on the input query, as described in greater detail above. In one implementation, the device may also convert the one or more files from a first modality into a different modality for inclusion in the response, based on a preference indicated by the requester.

At step 825, as detailed above, the device may provide, to the requester, a response to the input query that is based on the output of the multimodal large language model and on the one or more files. In some instances, the response includes text and a link to the one or more files. In other instances, the response includes a link to the one or more files converted into the different modality. In further instances, the response includes two or more of: text, an image, audio, or video.

Procedure 800 may then end at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for response generation using multimodal RAG, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

receiving, at a device, an input query from a requester;

using, by the device, a multimodal large language model to convert at least a portion of the input query into transcribed text and to generate an output based on the input query;

identifying, by the device, one or more files by performing a search of an information retrieval index based on the input query;

generating, by the device, a multimodal response by inserting one or more references to the one or more files into the output of the multimodal large language model, wherein the one or more references comprise one or more selectable links that link to one or more specific segments within the one or more files; and causing, by the device, a display to present the multimodal response to the requester via a user interface, wherein the user interface comprises the one or more selectable links to enable the requester to access the one or more specific segments of the one or more files.

2. The method as in claim 1, further comprising:

converting the one or more files from a first modality into a different modality for inclusion in the multimodal response, based on a preference indicated by the requester.

3. The method as in claim 2, wherein the multimodal response includes a link to the one or more files converted into the different modality.

4. The method as in claim 1, wherein the input query includes two or more of: text, an image, audio, or video.

5. The method as in claim 1, further comprising:

determining whether a large language model is able to answer the input query using the transcribed text.

6. The method as in claim 5, wherein the device uses the multimodal large language model to generate the output based on the input query, when the large language model indicates that it cannot answer the input query based on the transcribed text.

7. The method as in claim 5, further comprising:

comparing an output of the large language model generated using the transcribed text with the output of the multimodal large language model generated based on the input query, to determine which to include in the multimodal response.

8. The method as in claim 1, wherein the multimodal response includes two or more of: text, an image, audio, or video.

9. An apparatus, comprising:

one or more network interfaces;

a processor coupled to the one or more network interfaces and configured to execute one or more processes; and a memory configured to store a process that is executable by the processor, the process when executed configured to:

receive an input query from a requester;

use a multimodal large language model to convert at least a portion of the input query into transcribed text and to generate an output based on the input query;

identify one or more files by performing a search of an information retrieval index based on the input query;

generate a multimodal response by inserting one or more references to the one or more files into the output of the multimodal large language model, wherein the one or more references comprise one or more selectable links that link to one or more specific segments within the one or more files; and cause a display to present the multimodal response to the requester via a user interface, wherein the user interface comprises the one or more selectable links to enable the requester to access the one or more specific segments of the one or more files.

10. The apparatus as in claim 9, wherein the process when executed is further configured to:

convert the one or more files from a first modality into a different modality for inclusion in the multimodal response, based on a preference indicated by the requester.

11. The apparatus as in claim 10, wherein the multimodal response includes a link to the one or more files converted into the different modality.

12. The apparatus as in claim 9, wherein the input query includes two or more of: text, an image, audio, or video.

13. The apparatus as in claim 9, wherein the process when executed is further configured to:

determine whether a large language model is able to answer the input query using the transcribed text.

14. The apparatus as in claim 13, wherein the apparatus uses the multimodal large language model to generate the output based on the input query, when the large language model indicates that it cannot answer the input query based on the transcribed text.

15. The apparatus as in claim 13, wherein the process when executed is further configured to:

compare an output of the large language model generated using the transcribed text with the output of the multimodal large language model generated based on the input query, to determine which to include in the multimodal response.

16. The apparatus as in claim 9, wherein the multimodal response includes two or more of: text, an image, audio, or video.

17. A tangible, non-transitory, computer-readable medium storing program instructions that cause a device to execute a process comprising:

receiving, at the device, an input query from a requester;

using, by the device, a multimodal large language model to convert at least a portion of the input query into transcribed text and to generate an output based on the input query;

identifying, by the device, one or more files by performing a search of an information retrieval index based on the input query;

generating, by the device, a multimodal response by inserting one or more references to the one or more files into the output of the multimodal large language model, wherein the one or more references comprise one or more selectable links to one or more specific segments within the one or more files; and causing, by the device, a display to present the multimodal response to the requester via a user interface, wherein the user interface comprises the one or more selectable links to enable the requester to access the one or more specific segments of the one or more files.

18. The tangible, non-transitory, computer-readable medium as in claim 17, wherein the process further comprises:

converting the one or more files from a first modality into a different modality for inclusion in the multimodal response, based on a preference indicated by the requester.

19. The tangible, non-transitory, computer-readable medium as in claim 18, wherein the multimodal response includes a link to the one or more files converted into the different modality.

20. The tangible, non-transitory, computer-readable medium as in claim 17, wherein the input query includes two or more of: text, an image, audio, or video.

* * * * *